Aug. 13, 1935.  W. THAL  2,011,384
SUPERVISING A LOADED ALTERNATING CURRENT CONDUCTOR
Filed Dec. 10, 1932
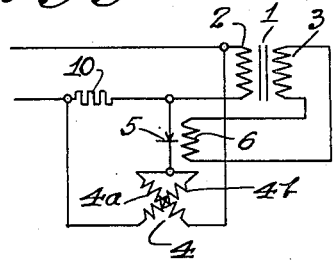
Fig. 1.
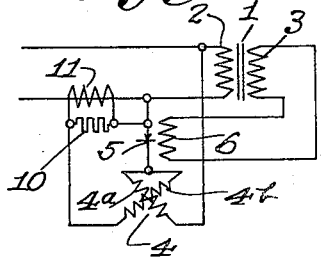
Fig. 2.
Fig. 3.
Inventor
Wilhelm Thal
by
Lotka v. Kehlenbeck
Attorneys Patented Aug. 13, 1935

2,011,384

UNITED STATES PATENT OFFICE 2,011,384

SUPERVISING A LOADED ALTERNATING CURRENT CONDUCTOR

Wilhelm Thal, Nowawes, near Potsdam, Germany, assignor to Siemens & Halske, Aktiengesellschaft, Siemensstadt, near Berlin, Germany, a corporation of Germany Application December 10, 1932, Serial No. 646,667
In Germany November 25, 1931

12 Claims. (Cl. 175—183)

My invention relates to improvements in apparatus for supervising a loaded alternating current conductor.

It is known to utilize the variations in resistance for measuring the temperature of alternating current conductors, the temperature being measured in the usual manner after the operating current has been switched off. This very accurate method of measuring has the disadvantage that it can not be used during the operation of the plant, and therefore requires such operation to be stopped while the measurement is being effected. It has therefore been suggested to determine the temperature of an alternating current conductor under load by means of a suitable temperature measuring apparatus, such as a thermo-couple, located as close as possible to the conductor. This method has the disadvantage that it is difficult and sometimes impossible to apply the temperature measuring instrument to finished machines or apparatus, and that special lines must be laid from the measuring point to the observation point. This measuring arrangement has furthermore considerable time lag constant which in certain cases is very disturbing.

It is, accordingly, a primary object of my invention to provide an accurate and simple apparatus for indicating the condition of loaded alternating current conductors which, as contrasted with the arrangements heretofore employed, may be utilized to yield accurate data during the operation of the conductor, even though the same be relatively inaccessible, as for example the case in transformer and other windings. I attain this end by utilizing for measuring the temperature, the change in resistance which occurs in the conductor when by the passage of the alternating current it is brought from the initial cold condition to the higher temperature it assumes during the operation. In order to determine the resistance during operation, or rather the difference between said resistance and the initial resistance of the cold conductor, I determine, according to the present invention, the ohmic voltage component of the voltage drop of the operating current flowing through the conductor. From this ohmic voltage component of such voltage drop I can determine directly the ohmic resistance of the current-carrying conductor, and the change in resistance as compared with a calibration point obtained while the conductor is cold, will yield a positive measure of the temperature of the conductor at the time such change in resistance due to operation is measured.

Several embodiments of my invention are illustrated in the drawing affixed to my specification and forming part thereof.

In the drawing:

Figure 1 is a diagrammatic view illustrating a simple arrangement constituting one embodiment of my invention, in which a cross-coil measuring instrument is employed, one coil of which is connected across the A. C. conductor to be supervised and the other coil of which instrument is provided with a shunt, which shunt and coil are in series with the conductor to be supervised;

Figure 2 is a diagrammatic view of a similar arrangement in which the second coil of the instrument is energized by a distinct current transformer, the secondary winding of which latter is shunted and connected, at one common terminal, to the A. C. conductor to be supervised; and Figure 3 is a detail view of an arrangement constituting a preferred embodiment of my invention as applied for the supervision of the windings of a service transformer.

Like parts are indicated by like numerals of reference throughout all the figures of the drawing.

Referring to Figs. 1 and 2, 1 is the iron core of a current transformer, 2 the primary winding and 3 the secondary winding of the transformer. For measuring the ohmic voltage component there is employed a direct current cross coil measuring instrument 4 associated with a separately excited synchronous switch 5. The exciting winding of the synchronous switch is designated by 6. The interrupter of the synchronous switch 5 and one winding 4a of the direct current instrument 4 are disposed in series, and constitute a circuit shunted across the primary winding 2 of the current transformer. The instrument winding 4a is, therefore, energized in accordance with the potential difference across the winding 2. The other winding 4b of the instrument 4 is energized in accordance with the instant current flowing through the transformer winding 2.

More specifically, and with reference to Fig. 1 of the drawing, the winding 4b and the interrupter of the switch 5 are provided with a shunt 10 of constant characteristics under varying temperatures, and said shunted winding 4b and interrupter circuit is disposed in series with the winding 2 of the current transformer. Accordingly, the winding 4b of the instrument is energized in proportion to the intensity of the current passing through the winding 2. In Fig. 1 the exciting winding 6 of the synchronous switch 5 is connected to the terminals of the secondary 3 of the current transformer, with the result that the interrupter of the switch is actuated in phase or, more properly, in "synchronism" with the current in the primary winding 2. Thus the measuring instrument, the windings 4a and 4b of which are disposed in series with the interrupter of the switch 5, is energized in accordance with the instant ohmic component of the voltage drop in the winding 2 of the current transformer. As current transformers are operated with very low saturations of the iron core, the iron losses may as a rule be disregarded so that the instrument practically measures a mean value of the ohmic resistances of the windings 2 and 3. If the specific current load of both windings is equal, the measurement gives practically a well defined resistance value. In the case of moderately unequal loads the deviations from the mean value are so small that from the results of the measurements reliable conclusions may still be drawn as regards the temperature.

The reading obtainable from the apparatus thus described will be an indication of the total ohmic resistance of the supervised conductor, i. e., the resistance normal to the conductor when cold or under "zero load" plus that due to its loaded or "heated" condition. A reading indicative of ohmic resistance due solely to load may be obtained by the well known expedients of mechanically suppressing the zero point of the measuring instrument with a spring or by calibrating the scale accordingly. Likewise, a similar result may be electrically effected by the application of an independent counter electro-motive force so applied as to oppose the meter-energizing current. Either of these expedients may be employed to obtain a needle or indicator deflection accurately representative of ohmic resistance in the A. C. conductor due to load condition per se.

In Fig. 2 there is shown an arrangement embodying my invention and generally similar to that illustrated in Fig. 1, the coil or winding 4b of the direct current measuring instrument 4 being transformer-coupled to the winding 2 through a current transformer 11, instead of by galvanic series coupling as in Fig. 1. In this instance, the shunt 10 is disposed across the secondary of the current transformer 11 and performs the same by-pass function, protecting the winding 4b, yet permitting its energization in accordance with current intensity in the winding 2 of the transformer being supervised. In the systems shown in Figs. 1 and 2 the value I (R+δR) : I, i. e. R+δR is first measured by the cross-coil instrument, that is to say the value R+δR will be indicated by the instrument directly, irrespective of the current strength I. The instrument may also be made to indicate the resistance variation δR corresponding to the temperature variation, if the value R corresponding to the cold state of the conductor is compensated, for instance by providing the measuring instrument with a third coil arranged in the plane of the measuring current coil (that is, the coil connected in parallel with the coil 2) and is fed with a voltage dependent on the primary current. This will be understood upon considering that the measuring current coil alone will indicate the value I (R+δR), that is to say I.R+I.δR. The additional third coil will produce an opposing torque of the magnitude I.R, so that the two coils together will indicate the value I.R+I.δR−I.R.=I.δR. By adding the third coil, shifted by 90°, I obtain the desired indication I.δR:I=δR. I might also effect a direct compensation of the voltage corresponding to the cold condition of the conductor, by means of an opposing auxiliary voltage.

The above described systems are intended merely as examples of the invention. They may of course, be varied within wide limits. Thus, wherever this is deemed desirable, transformers may be used for connecting alternating current circuits, and so on.

The utility of an arrangement or system according to the invention extends far beyond the measurement of resistance or temperature or of changes in resistance or temperature. It may be used in all cases which involve measuring resistances or changes in resistance. It may, for instance, be employed for indicating shorts between windings and grounds of machines and more particularly transformers. If the voltage supplied to the measuring instrument and the excitation of the synchronous switch are taken from different sides of the transformer, (as in Figs. 1 and 2) breakdowns in operation cause momentary changes in the deflections of the indicating instrument due to the phase displacement between primary and secondary winding, thus providing an immediate indication of such breakdown or disturbance. It is possible to go a step farther in this direction and to excite the switch from a separate synchronous source of voltage synchronous with the operating current but independent thereof in phase. In this case the phase displacements caused by breakdowns in operation will become still more noticeable, so that the arrangement according to my invention may serve as a high-grade protection for transformers and generators. Simultaneously with the use just referred to my invention may also be employed for the supervision or control of temperatures, in which case I would provide means whereby, for the purpose of temperature measurements, the excitation of the synchronous switch could be connected temporarily to a source of voltage in phase with the operating current. As the arrangement has no time constant, the temperature could be read off immediately after switching in.

In Fig. 3 of the drawing my invention is illustrated as embodied in apparatus which is particularly adapted to the supervision of A. C. equipment in which the load is transmitted through inductively coupled windings, as for example a power transformer, the primary winding 13 of which is fed by an alternator 100 or other A. C. source, and is coupled, through the core 12, with the secondary winding 14 supplying the loaded line 11. Voltage transformers 15 and 16 have their primary windings 15a, 16a, connected across the primary and secondary windings 13, 14, respectively, of the power transformer.

A synchronous switch or rectifier of the vibrating reed type described and claimed in U. S. Patent No. 1,931,267 granted to Pfannenmüller, October 17, 1933 is employed, and the reed-actuating windings 39 thereof are energized, in synchronism with the alternating current flowing in the power transformer, through the medium of a current transformer 17. The secondary windings 15b, 16b of the voltage transformers 15, 16 are connected, in opposed relation, in a series circuit including one measuring coil 44 of the cross-coil direct-current measuring instrument 4 and the interrupter 37, 37' of the synchronous switch. The other measuring coil 43 of the cross-coil instrument 4 is energized by the current transformer 18 in the primary circuit of the power transformer, the secondary winding of the current transformer being provided with a shunt 45 which so loads said secondary that the voltage thereacross is proportional to the intensity of the current flowing through the primary winding 13 of the power transformer. As shown, the windings 43, 44 of the measuring instrument have a common terminal connected to one contact 37 of the interrupter, the shunted terminals of the secondary of the current transformer 18 being connected to the measuring coil 44 and interrupter contact 37', respectively.

The windings of the current transformers 15 and 16 are, obviously, so proportioned that the potentials across the secondary terminals thereof are equivalent, notwithstanding the fact that the windings 13 and 14 of the power transformer are proportioned to effect an increase or decrease in secondary line voltage: i. e., have a ratio other than 1::1.

In the embodiment illustrated in Fig. 3, the respective values of the voltage drop in the primary winding 13 and the secondary winding 14 of the power transformer are compared, and the difference therebetween is impressed upon the coil 43 of the measuring instrument. This difference is not, however, a measure of the ohmic resistance of the windings 13, 14 as it involves also the iron losses in the core 12 of the power transformer. The iron losses, however, have a substantially constant value regardless of the load on the transformer which, once computed, may be compensated by methods heretofore known.

In some cases, however, the saturation of the iron core varies considerably. In power transformers, for example, it may be necessary to reckon with voltage fluctuations of considerable magnitude and these, where the iron core of the transformer is saturated, may effect iron losses which also vary materially. Because of the fact that the range of such losses is substantially linear, the variations in voltage and heat radiation from the core may be utilized to obtain a reading in which variable iron losses are compensated. In order to obtain such compensation, a shunt 19 may be connected to the uncommon terminals of the indicator winding, which shunt is located in heating proximity to the core 12 and is formed of a material the electrical resistance of which varies in accordance with its temperature. In this manner the shunt 19 (which is optional) may be employed to effect a practical compensation of the apparatus to nullify the inaccuracy which may result from iron losses in the case of power transformers the cores of which are highly saturated.

The indication which would be provided by the coil 43, per se, does not take into consideration instant variations in current intensity. In order to obtain an accurate indication of the condition of the windings, despite such current variations during supervision, the coil 44 is employed which tends to oppose the indicating effect of the coil 43 and does so in direct proportion to the intensity of the current flowing in the transformer winding 13. Inasmuch as, for all practical purposes, the intensity of current is truly proportional in both primary and secondary windings of a power transformer, the coil 44, though energized only in accordance with current intensity in the primary winding 13, is effective in consistency with the current intensity in the secondary winding 14 as well.

Moreover, as previously explained in connection with the embodiment of my invention illustrated in Fig. 2, calibration of the arrangement to effect an indication not of total or "absolute" resistance, but of the increase in resistance under operating load as compared with the resistance at normal temperature, is effected by the simple expedient of depressing the zero point of the instrument 4, either mechanically or otherwise, so that the indicator thereof stands at the beginning of its scale under conditions of intact insulation and room temperature.

Provided with the above described compensations, the measuring instrument 4 of the arrangement illustrated in Fig. 3 will yield an indication corresponding the difference between the ohmic components of the voltage drop in the primary winding 13 and secondary winding 14 of the power transformer. In this manner accurate information as to the condition of the insulation of the windings 13 and 14 is constantly available regardless of variations in load and the requirement of removing the transformer from service for inspection is averted.

It will be apparent, to those skilled in the art to which the present invention pertains, that the invention is not limited to use solely for the determination of temperature and insulation conditions of transformer windings or other A. C. conductors. Likewise, and most particularly in the case of shorted windings and grounds, indications of such magnitude are obtainable that through the use of relay mechanisms, control may be afforded of powerful circuits for energizing aural or visible warning devices. I therefore claim my invention broadly, as indicated by the appended claims.

I claim as my invention:

1. In apparatus for supervising the operative condition of relatively inaccessible loaded alternating current conductors such as the windings of electrical machines or transformers, an indicating or recording measuring instrument, a rectifier in series with said instrument, the rectifier and instrument circuit being so electrically coupled to the alternating current conductor to be supervised as to cause said instrument to determine the value of the ohmic component of the A. C. voltage drop in said conductor, and means for neutralizing the effect of variations in the intensity of the operating current upon the measured result.

2. In apparatus for supervising the operative condition of relatively inaccessible loaded alternating current conductors such as the windings of electrical machines or transformers, an indicating or recording measuring instrument, a rectifier in series with said instrument, the rectifier and instrument circuit being so electrically coupled to the alternating current conductor to be supervised as to cause said instrument to determine the value of the ohmic component of the A. C. voltage drop in said conductor, and means to compensate for the indication of the measuring instrument which corresponds to the cold condition of the conductor.

3. In apparatus for supervising the operative condition of relatively inaccessible loaded alternating current conductors such as the windings of electrical machines or transformers, an indicating or recording measuring instrument, a rectifier in series with said instrument, the rectifier and instrument circuit being so electrically coupled to the alternating current conductor to be supervised as to cause said instrument to determine the value of the ohmic component of the A. C. voltage drop in said conductor, and means for impressing upon the instrument a compensating current for eliminating or nullifying that portion of the indication of the measuring instrument which corresponds to the cold test of the conductor.

4. In apparatus for supervising the operative condition of relatively inaccessible loaded alternating current conductors such as the windings of electrical machines or transformers, an indicating or recording measuring instrument, a rectifier in series with said instrument, the rectifier and instrument circuit being so electrically coupled to the alternating current conductor to be supervised as to cause said instrument to determine the value of the ohmic component of the A. C. voltage drop in said conductor, and a shunt in the circuit leading from the measuring instrument to the alternating current conductor for establishing and supplying an opposing voltage such that the indication of the instrument which corresponds to the cold state of the conductor is compensated to zero.

5. In an arrangement for supervising the operative condition of relatively inaccessible loaded alternating current conductors such as the windings of electrical machines or transformers, a direct current measuring instrument having a measuring current coil and a directing current coil, a rectifier in series with the measuring current coil, said measuring current coil and rectifier circuit being electrically coupled across the loaded alternating current conductor to be supervised, and means for applying to the directing current coil a current proportional to the current flowing through the conductor.

6. In an arrangement for supervising the operative condition of relatively inaccessible loaded alternating current conductors such as the windings of electrical machines or transformers, a direct current measuring instrument having a measuring current coil and a directing current coil, a rectifier in series with the measuring current coil, said measuring current coil and rectifier circuit being electrically coupled across the loaded alternating current conductor to be supervised, said directing current coil of the measuring instrument being connected through said rectifier to a shunt, said shunt being electrically associated with the conductor.

7. In an arrangement for supervising the operative condition of relatively inaccessible loaded alternating current conductors such as the windings of electrical machines or transformers, a direct current measuring instrument having a measuring current coil and a directing current coil, a rectifier in series with the measuring current coil, said measuring current coil and rectifier circuit being electrically coupled across the loaded alternating current conductor to be supervised, and a shunt bridging the secondary winding of a transformer in the circuit containing the conductor.

8. In an arrangement for supervising the operative condition of loaded windings of alternating current machines or transformers, an indicating or recording instrument, a rectifier in series with said instrument, the rectifier and instrument circuit being electrically coupled across the alternating current winding to be supervised, means for neutralizing the effect of variations in the intensity of the operating current upon the measured result, and means for controlling the sensitivity of the measuring instrument to compensate for the influence of variable iron losses upon said instrument.

9. In an arrangement for supervising the operative condition of loaded windings of alternating current machines or transformers, a direct current measuring instrument having a measuring current coil and a directing current coil, said coils each having one terminal in common, a rectifier in series with the measuring current coil, said measuring current coil and rectifier circuit being electrically coupled across the loaded winding to be supervised, said directing current coil being connected through the rectifier to a shunt, said shunt being coupled into the circuit containing the winding to be supervised, and a second shunt bridging the uncommon terminals of said coils, said second shunt having a resistance value variable in accordance with temperature changes.

10. In an arrangement for supervising the operative condition of relatively inaccessible loaded alternating current conductors such as the windings of electrical machines or transformers, an indicating or recording measuring instrument, a rectifier in series with said instrument, said rectifier and instrument circuit being electrically coupled across the alternating current conductor to be supervised, a source of current for actuating the rectifier, said source of current being synchronous with the source of the current feeding the conductor and dependent thereon, and means for neutralizing the effect of variations in the intensity of the operating current upon the measured result.

11. In apparatus for supervising the operative condition of relatively inaccessible loaded alternating current conductors, such as the windings of electrical machines or transformers, an indicating or recording measuring instrument having a pair of associated windings, means for supplying to one of said windings a current proportional to the ohmic component of the potential drop of the current in the alternating current conductor and means for supplying to the other of said windings a current proportional to the intensity of the current in the alternating current conductor.

12. In apparatus for supervising the operative condition of relatively inaccessible alternating current conductors, the combination of an indicating or recording measuring instrument, means electrically coupling said instrument to the conductor to be supervised, said means supplying a current to said instrument such that said instrument directly determines the value of the ohmic component of the A. C. voltage drop of the current flowing in said conductor, and means for neutralizing the effect of variations in current load in said conductor during its supervision.

WILHELM THAL.